May 29, 1962  A. K. OTTO  3,037,179
TEMPERATURE SENSING DEVICES
Filed April 20, 1961  2 Sheets-Sheet 1
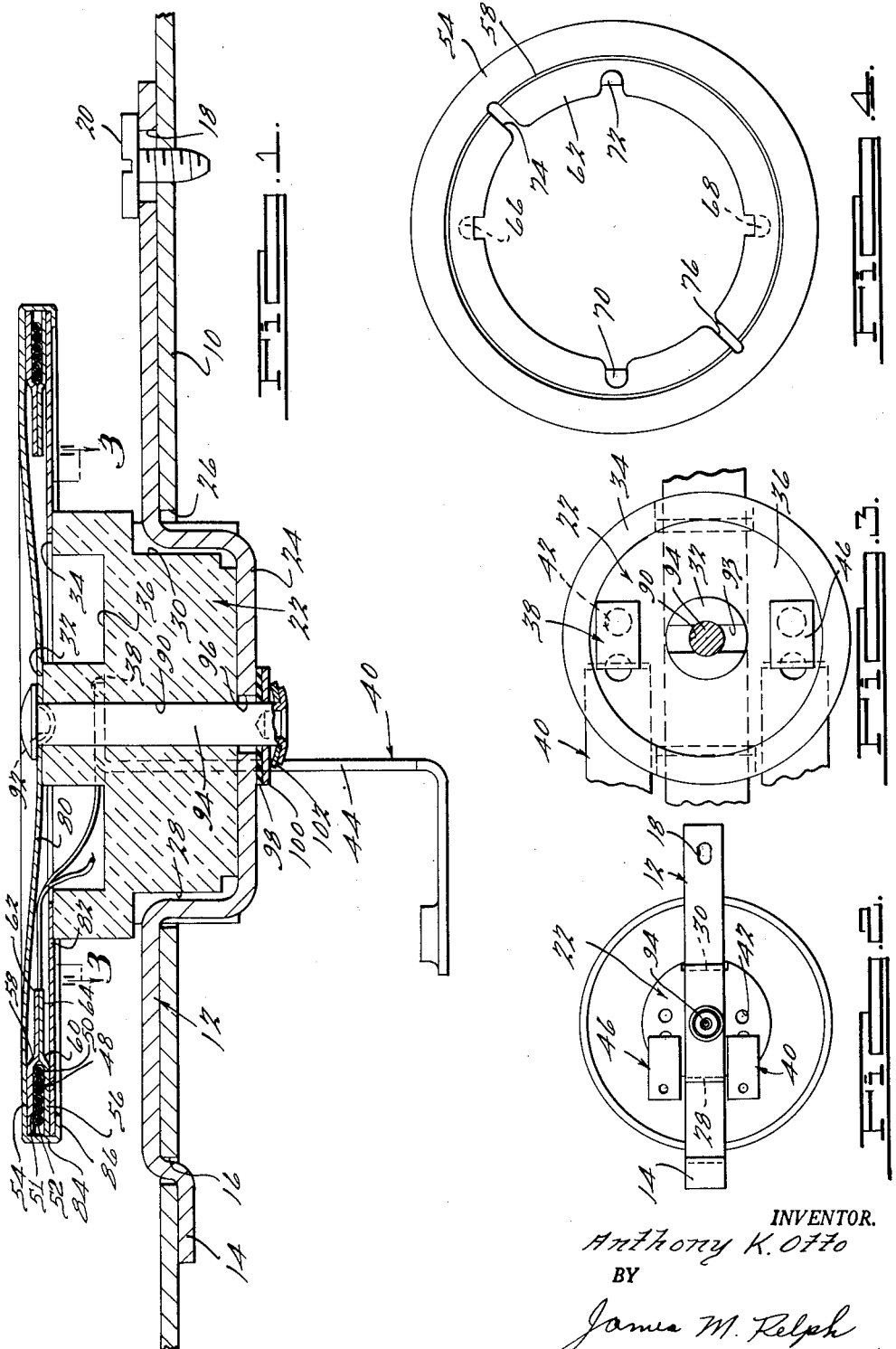
INVENTOR.
Anthony K. Otto
BY
James M. Relph
ATTORNEY.

May 29, 1962 A. K. OTTO 3,037,179
TEMPERATURE SENSING DEVICES
Filed April 20, 1961 2 Sheets-Sheet 2
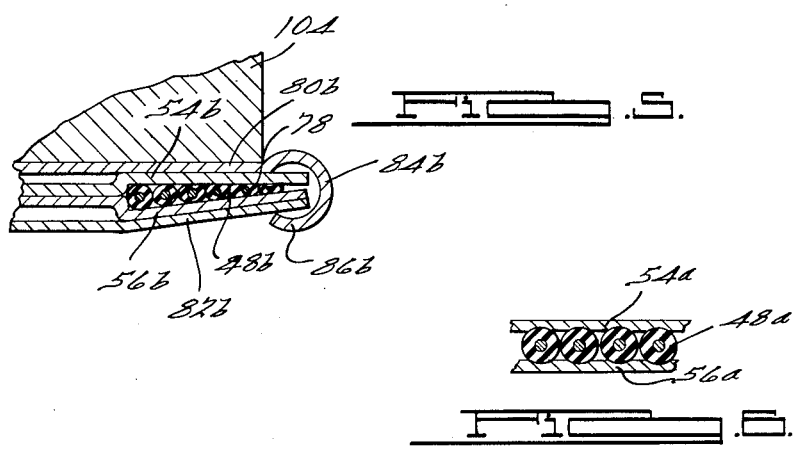
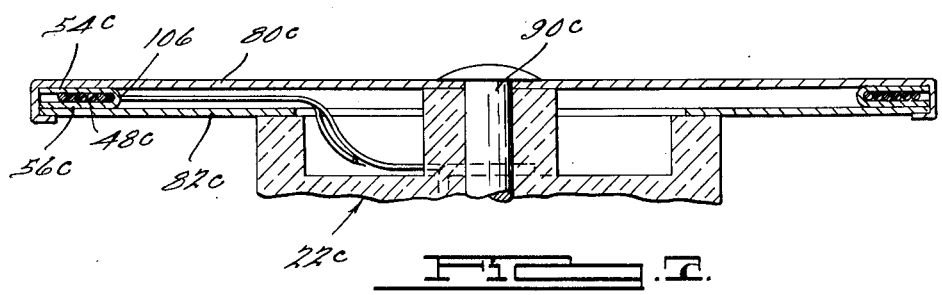
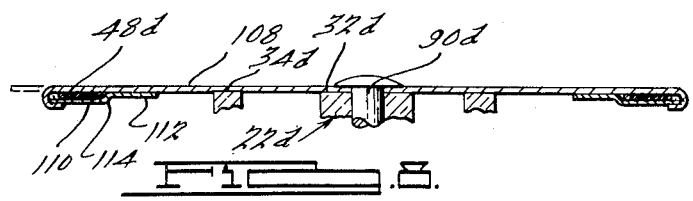
INVENTOR.
Anthony K. Otto
BY
James M. Ralph
ATTORNEY.

United States Patent Office 3,037,179  
Patented May 29, 1962

3,037,179  
TEMPERATURE SENSING DEVICES  
Anthony K. Otto, Ann Arbor, Mich., assignor to King-Seeley Thermos Co., Ann Arbor, Mich., a corporation of Michigan  
Filed Apr. 20, 1961, Ser. No. 104,449  
18 Claims. (Cl. 338—28)

This invention relates to temperature sensing devices.

An object of this invention is to improve the accuracy of temperature measurement by enhancing the heat transfer relationship between a coil of temperature sensing wire and a mass, the temperature of which is to be sensed and by minimizing heat transfer between that coil and bodies which are or may be at temperatures differing from the temperature of the mass.

Another object of this invention is to minimize errors in the sensed-temperature indication produced by a current-carrying coil of temperature sensing wire resulting from self heating of that wire.

Another object of the invention is to rigidly support a coil of temperature sensing wire in good heat transfer relation with a mass and to protect the coil against damage.

The principles of the present invention have representatively been applied to a temperature senser adapted to sense the temperature of the mass of air in an oven. A plural-turn single layer flat coil of electrically insulated wire having a high positive temperature coefficient of resistance and having an inner turn of a diameter which is several times as large as the distance between the inner and outer turns is sandwiched between a pair of plates having good heat conductivity characteristics. These plates are supported by but effectively thermally isolated from a centrally disposed ceramic support member which is appreciably smaller in size than the diameter of the inner turn of wire and substantially spaced therefrom. The ceramic support member is secured in any suitable fashion to the oven wall. While the ceramic support member may well be at a temperature different than the temperature of the air in the oven due to its location and its heat transfer relation with the wall of the oven, the disposition of the temperature sensing coil at a position substantially spaced from the ceramic support member and the establishment of a poor heat transfer path between the coil and the ceramic support member effectively prevents improper thermal influence of the coil by the support member.

By forming the temperature sensing wire in a relatively large diameter coil, a longer length of lower resistance wire may be used, for a given total senser resistance, than with a smaller diameter coil, thereby reducing temperature sensing errors resulting from heating of the coil by the sensing current passing therethrough.

The manner of accomplishing the foregoing objects and other objects and features of the invention will become apparent from the following detailed description of embodiments of the invention when read with reference to the accompanying drawings in which:

FIGURE 1 is a sectional view of a preferred embodiment of the invention representatively shown in association with an oven wall;

FIG. 2 is a view of the undersurface of the unit of FIG. 1, shown apart from the oven wall;

FIG. 3 is a sectional view taken substantially along the line 3—3 of FIG. 1;

FIG. 4 is a view of the coil-form subassembly of the unit of FIG. 1;

FIG. 5 is a fragmentary sectional view of a modified form of certain of the elements of FIG. 1;

FIG. 6 is a fragmentary sectional view of a modification of a portion of the structure of FIG. 1;

FIG. 7 is a fragmentary sectional view of a modified temperature sensing unit; and FIG. 8 is a fragmentary sectional view of a still further modified form of temperature sensing unit.

The temperature sensing unit illustrated in FIG. 1 of the drawing is illustrated in association with the wall 10 of an oven of a stove, with the interior of the oven being above the wall 10 in the showing of FIG. 1. While in the utilization of the device as an oven senser mounted on the wall of the oven, the view of FIG. 1 would represent a horizontal sectional view, for simplicity the relationship of the parts of the temperature senser will be described with plate 80 in FIG. 1 being considered to be the top of the senser unit.

A mounting strap or bracket 12 is provided with an offset end portion 14 which is insertable through a slot 16 in the oven wall 10 so as to engage the outer surface of that oven wall, and is further provided with an elongated aperture 18 through which a mounting screw 20 may be threaded into the oven wall 10.

A generally circular support member 22 of, for example, ceramic, is seated in a saddle portion 24 of the mounting bracket 12 which projects through a circular opening 26 in the oven wall 10. The support member 22 is provided with recesses 28 and 30 (FIGS. 1 and 2) on diametrically opposed sides thereof to accept the side legs of the saddle portion 24 and thereby prevent relative rotation between support member 22 and the bracket 12.

Support member 22 further includes a circular upper central face portion 32 (FIGS. 1 and 3) and an outer annular upper face portion 34 separated from one another by a depressed annular recess 36. The head flange 38 of a terminal 40 is disposed within the recess 36 and rests against the face thereof in a position overlying a longitudinal aperture 42 (FIGS. 2 and 3) extending through the member 22. The shank 44 of the terminal 40 extends through a transversely slotted aperture in the support member 22 disposed to one side of the bracket 24. The shank 44 may be shouldered adjacent the under surface of the support member 22 to prevent upward movement of the terminal 40 with respect of the support member 22 (in the view of FIG. 1), and in that case, the head flange 38 is bent to its illustrated position after the terminal shank 44 is inserted through the slotted aperture in the support member 22.

A second corresponding terminal 46 is symmetrically disposed in the support member to the other side of the mounting bracket 12.

The support member 22 supports a senser subassembly including an electrically insulated wire 48 (FIG. 1) having a high positive temperature coefficient of resistance. While any suitable wire may be employed, in a constructed embodiment of the invention, the senser wire was approximately No. 35 B & S gauge "Hytempco" wire having a resistance of about four ohms per foot at 20° centigrade and having a temperature coefficient of resistance at that same temperature of about 0.0047 ohm per ohm per degree centigrade. The wire was annealed and enameled and insulated with fiberglass with a binder.

The temperature sensing wire is wound in a plural turn, single layer, flat coil, with the diameter of the inner turn 50 being large (about 60 percent larger in the constructed unit) relative to the diameter of the support member 22 and being several times as large (about ten times in the constructed unit) as the distance between the inner turn 50 and the outer turn 52. As will be seen, the wire 48 is representatively bifilarly wound, that is, the wire is doubled so that radially adjacent turns (such as turns 51 and 52) are not necessarily directly adjacent one another in a longitudinal sense.

The coil of wire 48 is sandwiched between a pair of plates 54 and 56 of good heat conductive material such as aluminum, with the plate 56 underlying the coil and with the plate 54 overlying the coil and both engaging the turns thereof. Plates 54 and 56 are provided with offsets defining wall portions 58 and 60, respectively, which together constitute an inner wall abutting the side of the inner turn 50 of the coil. Each of those wall portions is in addition integral with an inwardly extending flange portion 62 and 64, respectively. As may best be seen in FIG. 4 of the drawings, flange portions 62 and 64 abut one another and are secured together as by means of diametrically opposed tabs 66 and 68 on flange portion 62 each of which engages both an inner edge slot in and the undersurface of flange portion 64, and by means of a pair of diametrically opposed tabs 70 and 72 on flange portion 64 each of which engages both a corresponding inner edge slot in and the upper surface of flange portion 62.

The ends of the temperature sensing wire 48 extend radially inwardly of the coil-form assembly via one or both of two diametrically opposed slots 74 and 76 formed in both plates 54 and 56 and extending slightly outwardly of the wall portions 58 and 60.

While other procedures may be employed, in the presently preferred arrangement, the plates 54 and 56 are assembled to form the subassembly illustrated in FIG. 4, an appropriate length of the temperature sensing wire is doubled, and the two terminal ends thereof are projected through one or both of the slots 74 and 76 from the outside in, that is, the terminal ends are moved radially inwardly in passing them through the slot or slots 74 and 76. In the arrangement illustrated in FIG. 1, it is assumed that both terminal ends or pigtails are inserted through the same slot.

Those two terminal ends are then held against movement relative to the plates 54 and 56, a moderate restraining force is applied to the bight of the wire loop, and then the assembled plates 54 and 56 are rotated about their central axis relative to the bight of the loop to wind the wire bifilarly between the two plates 54 and 56. It will be observed that the inner wall including wall portions 58 and 60 serves as a winding form or mandrel and the plates 54 and 56 serve essentially as spoolheads.

The clearance between the plates 54 and 56 may be selected so that the wire is wedged therebetween to retain the bight in place as the winding is completed. Alternatively or additionally, the bight may be adhesively secured between the plates 54 and 56 pending completion of the subsequent assembly operations or the two plates 54 and 56 may be crimped together at the location of the bight or completely around the periphery of the coil form, if desired.

It is contemplated that in order to improve the heat transfer relationship between the electrically insulated wire 48 and the plates 54 and 56, the subassembly including that wire and those plates may be subjected to a compressive force serving to move plates 54 and 56 towards one another. If soft aluminum is employed for the plate 54 or 56, and if sufficient compressive force is applied, the turns of electrically insulated wire may actually be embedded in the surface of those plates, as is illustrated in FIG. 6 of the drawings, so that each cross sectional increment of the wire makes area contact with both of the plates rather than just line contact with each of those plates. If harder aluminum or other harder metal is employed for the plates 54 and 56, the insulated wire, rather than becoming embedded in those plates, may be slightly flattened, as is representatively illustrated at turn 78 in FIG. 5. In either case, this operation may, if desired, serve to secure the coil within the coil form in lieu of the other methods above discussed.

The subassembly including plates 54 and 56 and wire 48 is then disposed within a cap or shield assembly including a thin upper plate 80 and a thin lower plate 82. These plates function as elements of the means for supporting the coil 48 upon support member 22 as well as means for protecting the wire from mechanical damage. Since support member 22 is subject to being at a temperature differing than the temperature of the mass of air within the oven, it is desirable to thermally isolate wire 48 from support member 22, and since plates 80 and 82 engage support member 22, it is therefore desirable that they be constructed and arranged to serve as a poor heat transfer path. This may be accomplished by manufacturing those plates of metal having relatively poor thermal conductivity characteristics, such as thin stainless steel, and in the constructed arrangement, both plates were made of stainless steel about 0.010 inch thick.

The lower plate 82 is annular and its inner peripheral portion rests upon the outer annular face portion 34 of the support member 22. The outer diameter of plate 82 is substantially equal to the diameters of plates 54 and 56.

The upper plate 80 engages the central face portion 32 of the support member 22. At its outer periphery it is provided with a depending flange 84, serving as the outer wall of the asesmbly, and an annular flange portion 86 underlying and engaging the peripheral edge of the lower plate 82 and serving to clamp the cap assembly together. The upper surface of the plate 80 is or may be cupped either during the manufacture thereof or during assembly to the support member 22.

The upper plate 80 is provided with a central aperture aligned with a central longitudinal bore 90 formed in the support member 22 and is depressed adjacent that aperture to define a short central tongue 92 (FIG. 1) engageable with a transverse groove 93 (FIG. 3) formed in the central face portion 32 of the support member 22. This engagement orients the parts and locks plate 80 against rotation relative to support member 22.

A rivet 94 is inserted through the central aperture in the plate 80, through the bore 90 in the support member 22, and through an aligned but enlarged aperture 96 in the support bracket 12. An insulating washer 98, a flat washer 100 and a spring washer 102 are trapped between the rivet and the undersurface of the bracket 12. While the head of rivet 94 engages the plate 80, that plate is insulated from the bracket 12 and hence from the oven wall 10 by means including the insulator washer 98 so that the sensing circuit will not be grounded to the oven in the event of a short circuit between the senser wire and any of the plates 54, 56, 80 or 82.

The terminal ends of the wire 48 are connected, respectively, to terminals 40 and 46 as by welding. In practice, this may be accomplished prior to the attachment of plate 80 to the support member 22 by placing each terminal end of the wire 48 in engagement with the associated terminal head portion such as portion 38, placing one resistance-welding electrode against that terminal end of the wire, and inserting the other resistance-welding electrode through the aperture in the support member, such as aperture 42 (FIGS. 2 and 3), and into engagement with the head portion of the terminal, such as portion 38.

While the illustrated construction possesses the advantage that the wire 48 is disposed in good heat transfer relation with the oven air by virtue of the short direct metallic path between that electrically insulated wire and the air and yet is disposed in relatively poor heat transfer relation with the support member 22 due to the physical distance between the wire and that support member and the relatively poor heat transfer path therebetween, the disposition of the coil of wire at a large radius relative to that of the support member possesses a further advantage in the minimization of the effects of self heating of the wire. The temperature sensing wire is connected in a sensing circuit including a responder device and effectively modulates or changes the magnitude of the current or voltage in that circuit in accordance with the sensed temperature. The nominal total resistance of the wire must be selected in the light of the resistance and sensitivity of the responding device and in the light of the current carrying capabilities of the wire. A shorter length of finer wire must be utilized to provide a given selected total nominal resistance if the diameter of the sensing coil is small than if that diameter is, as illustrated, relatively large. The greater the resistance of the wire per unit length, the greater the wattage and heat produced by the flow of the selected current through that unit-length resistance, and the shorter the wire the less the surface area for dissipating the generated heat. Both factors tend to lead with relatively short and fine wires, to an appreciable rise in temperature of the wire due to the passage of the sensing current therethrough and accordingly a false temperature indication. In the illustrated arrangement in which the outer diameter of the coil is made relatively large (about 2½ inches in a constructed embodiment), a much longer length of wire (about 5 feet in the constructed arrangement) may be utilized even with a relatively small number of turns (four or five bifilar turns in the constructed arrangement). As a result, for a given total nominal senser resistance (e.g., 20 ohms) a larger diameter wire may be employed having a smaller resistance per unit length so that the wattage produced per unit length with a given sensing-circuit current is reduced. Additionally, the area of the upper and lower surfaces of the coil, and hence the heat dissipating capability of the coil, is greater than if the same number of turns were disposed at a smaller diameter. Both factors contribute to the effective minimization of temperature sensing errors due to the self-heating of the temperature sensing wire.

As illustrated in FIG. 5 of the drawings, the upper plate 80b may be spun around and under the lower plate 82b through the use of apparatus including a die or backing member 104 which is circular but has a diameter which is somewhat less than the outer diameter of the plates 54b and 56b. The spinning tool may then form the flange portions 84b and 86b and in the process deflect the edge of the lower plate 82b upwardly so as to tightly clamp the turns of wire 48b between the two plates 54b and 56b. Again, if these plates are of a quite ductile material such as soft aluminum, embedding of the turns in the surface of the aluminum may occur, as is illustrated in FIG. 6.

In the alternative arrangement illustrated in FIG. 7 of the drawings, the parts and the relationships thereof are similar to that illustrated in FIG. 1 except that the pair of centrally apertured plates 54c and 56c are here actually integral with each other and with the inner wall 106. The integral coil form illustrated in FIG. 7 may be formed of a thin, ductile metal as, for example, of aluminum in the order of 0.0126 inch thick.

In the alternative arrangement illustrated in FIG. 8 of the drawings, two, rather than four, plates are utilized to perform both the encasing and the supporting functions. A circular upper plate 108 abuts both the central face portion 32d and the outer annular face portion 34d of the support member 22d (which in this case are coplanar) and the peripheral edge thereof is spun or otherwise deflected so as to underlie the peripheral edge of a lower plate having an inner annular flange portion 112 which may be secured to plate 108 in any suitable fashion such as by welding. The lower plate 110 is provided with an offset portion 114 serving as the inner wall abutting the inner turn of the coil of resistance wire 48d while the edge of the plate 108 constitutes the outer wall. It will be observed that the wire 48d is in relatively good heat transfer relation with the mass of air surrounding the unit since it is spaced but a short distance therefrom by thin metallic elements, whereas the heat transfer between the coil of resistance wire 48d and the support member 22d is impeded due to the small cross section and substantial effective length of plate 108 in the region therebetween.

It will be appreciated that while the sensing units have been illustrated as being circular and described accordingly, other configurations may well be employed.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. In a temperature sensing device for sensing the temperature of a mass being heated by a source of heat, the combination of a support member in heat transfer relation with the source and subject to being at a temperature different than the temperature of the mass, a plural-turn single layer flat coil of electrically insulated wire having a significant temperature coefficient of resistance and having an inner turn of a diameter which is several times as large as the distance between the inner and outer turns, a first plate underlying said coil and engaging the turns thereof, a second plate overlying said coil and engaging the turns thereof, an inner wall extending between said plates and engaging the side of said inner turn of said coil and spaced a substantial distance from said support member, and means for securing said plates to said support member.

2. The combination of claim 1 in which at least a portion of said wall is integral with at least one of said plates.

3. The combination of claim 1 in which said wall comprises two abutting wall portions, with one portion being integral with one of said plates and the other portion being integral with the other plate.

4. The combination of claim 3 further including means for securing said plates together.

5. The combination of claim 3 in which each of said plates includes an inner flange portion disposed inwardly of the wall portion and secured to the flange portion of the other plate.

6. The combination of claim 1 in which one of said plates is substantially planar, in which said wall is a flange formed integrally with the other one of said plates, in which said other plate further includes a portion abutting said one plate and secured thereto and in which said means for securing said plates to said support member includes a portion of one of said plates extending into engagement with said support member.

7. The combination of claim 1 in which said wall and said plates are all integral.

8. The combination of claim 1 further including another wall spaced outwardly of said coil and adjacent the outer one of said turns and interconnecting said plates.

9. The combination of claim 8 in which said other wall is integral with one of said plates.

10. The combination of claim 8 further including a flange portion on said other wall engaging and clasping the other one of said plates.

11. In a temperature sensing device for sensing the temperature of a mass being heated by a source of heat, the combination of a pair of centrally apertured metal plates, a coil of electrically insulated wire having a significant temperature coefficient of resistance sandwiched between said plates, a support member in heat transfer relation with the source and subject to being at a temperature different than the temperature of the mass and smaller in size than the apertures in said plates, and means connected to said plates and to said support member and extending therebetween for supporting said plates and said coil upon said support member comprising a thin plate engaging said support member and larger in size than said support member and extending transversely therefrom into supporting engagement with at least one of said plates.

12. In a temperature sensing device for sensing the temperature of a mass being heated by a source of heat, the combination of a pair of centrally apertured metal plates, a coil of electrically insulated wire having a significant temperature coefficient of resistance sandwiched between said plates, a support member in heat transfer relation with the source and subject to being at a temperature different than the temperature of the mass and smaller in size than the apertures in said plates, and means connected to said plates and to said support member and extending therebetween for supporting said plates and said coil upon said support member comprising a thin plate engaging said support member and larger in size than said support member and extending transversely therefrom into supporting engagement with at least one of said plates and engaging one of said pair of plates, and a second thin plate engaging said support member and larger in size than said support member and extending transversely therefrom and engaging the other one of said pair of plates.

13. In a temperature sensing device for sensing the temperature of a mass being heated by a source of heat, the combination of a pair of centrally apertured metal plates, a coil of electrically insulated wire having a significant temperature coefficient of resistance sandwiched between said plates, a support member in heat transfer relation with the source and subject to being at a temperature different than the temperature of the mass and smaller in size than the apertures in said plates, and means connected to said plates and to said support member and extending therebetween for supporting said plates and said coil upon said support member comprising a thin plate engaging said support member and larger in size than said support member and extending transversely therefrom into supporting engagement with at least one of said plates and engaging one of said pair of plates, and a second thin plate engaging said support member and larger in size than said support member and extending transversely therefrom and engaging the other one of said pair of plates and having an outer wall portion extending toward said other thin plate and a flange on said wall portion engaging said other thin plate.

14. The combination of claim 13 further including an inner wall extending between said pair of plates and engaging said coil and spaced a substantial distance from said support member, and in which said coil is enclosed by said inner wall, said pair of plates, and said outer wall.

15. The combination of claim 14 in which said thin plates are formed of a metal having poorer thermal conductivity characteristics than said pair of plates.

16. The combination of claim 14 in which at least a portion of said inner wall is integral with at least one of said pair of plates and further including interconnected and abutting flange means on said pair of plates.

17. In a temperature sensing device for sensing the temperature of a mass being heated by a source of heat, the combination of a rigid non-metallic support member in heat transfer relation with the source and subject to being at a temperature different than the temperature of the mass, said support member comprising a central face portion and an outer annular face portion, a plural-turn single layer flat coil of electrically insulated wire having a significant temperature coefficient of resistance and having an inner turn of a diameter which is appreciably larger than the diameter of said outer annular face portion, a first coil-form plate of good heat conductive metal underlying said coil and engaging the turns thereof, a second coil-form plate of good heat conductive metal overlying said coil and engaging the turns thereof, an inner wall extending between said plates and engaging the side of said inner turn of said coil and spaced a substantial distance from said support member, a first thin centrally apertured plate extending between and engaging said first coil-form plate and said outer annular face portion, a second thin plate extending between and engaging said second coil-form plate and said central face portion, an outer wall formed integrally with one of said thin plates and engaging the other one of said thin plates, and means for securing said second thin plate to said support member.

18. In a temperature sensing device for sensing the temperature of a mass being heated by a source of heat, the combination of a rigid non-metallic support member in heat transfer relation with the source and subject to being at a temperature different than the temperature of the mass, said support member comprising a central face portion and an outer annular face portion, a plural-turn single layer flat coil of electrically insulated wire having a significant temperature coefficient of resistance and having an inner turn of a diameter which is larger than the diameter of said outer annular face portion, a first coil-form plate of good heat conductive metal underlying said coil and engaging the turns thereof, a second coil-form plate of good heat conductive metal overlying said coil and engaging the turns thereof, an inner wall extending between said plates and engaging the side of said inner turn of said coil and spaced a substantial distance from said support member, a first thin centrally apertured plate extending between and engaging said first coil-form plate and said outer annular face portion, a second thin plate extending between and engaging said second coil-form plate and said central face portion, an outer wall formed integrally with one of said thin plates and engaging the other one of said thin plates, means for securing said second thin plate to said support member, a metallic support bracket, means for securing said support member to said support bracket, and means including said support member for electrically insulating all of said plates from said metallic support bracket.

No references cited.